Sept. 3, 1946.  W. C. CLOTHIER ET AL  2,407,139
SYSTEM FOR PRODUCING REGULATED LIQUID PRESSURE
Filed Feb. 14, 1944  3 Sheets-Sheet 1
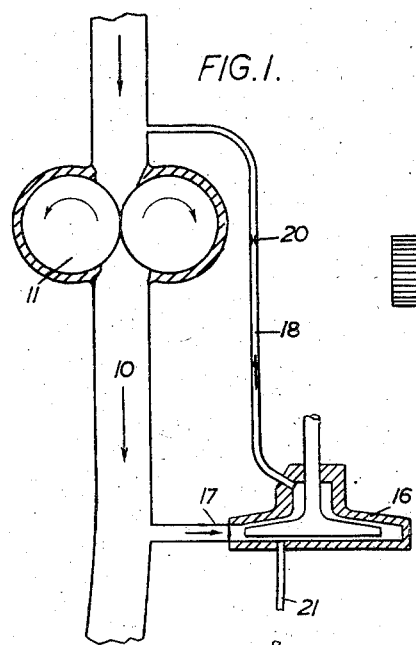
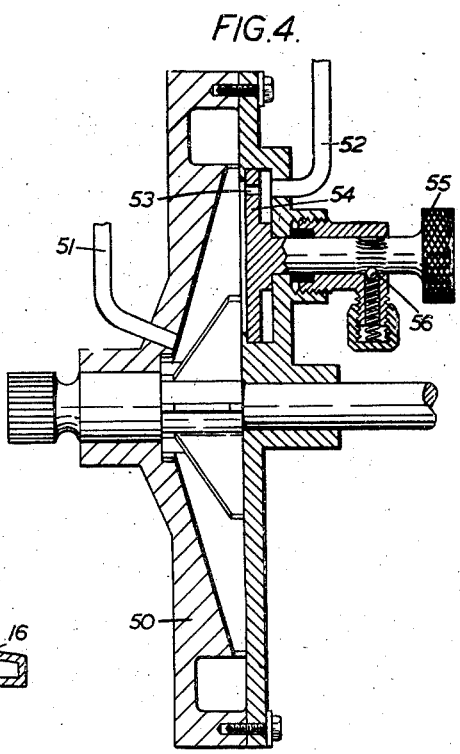
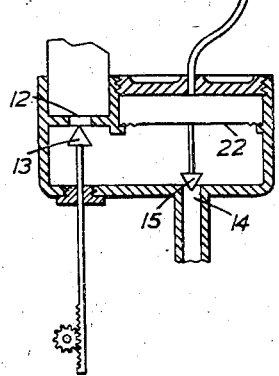
William Charles Clothier
Beatrice Naylor
John Ernest Patrick Dunning
Inventors
By Loyd Hall Sutton
Attorney

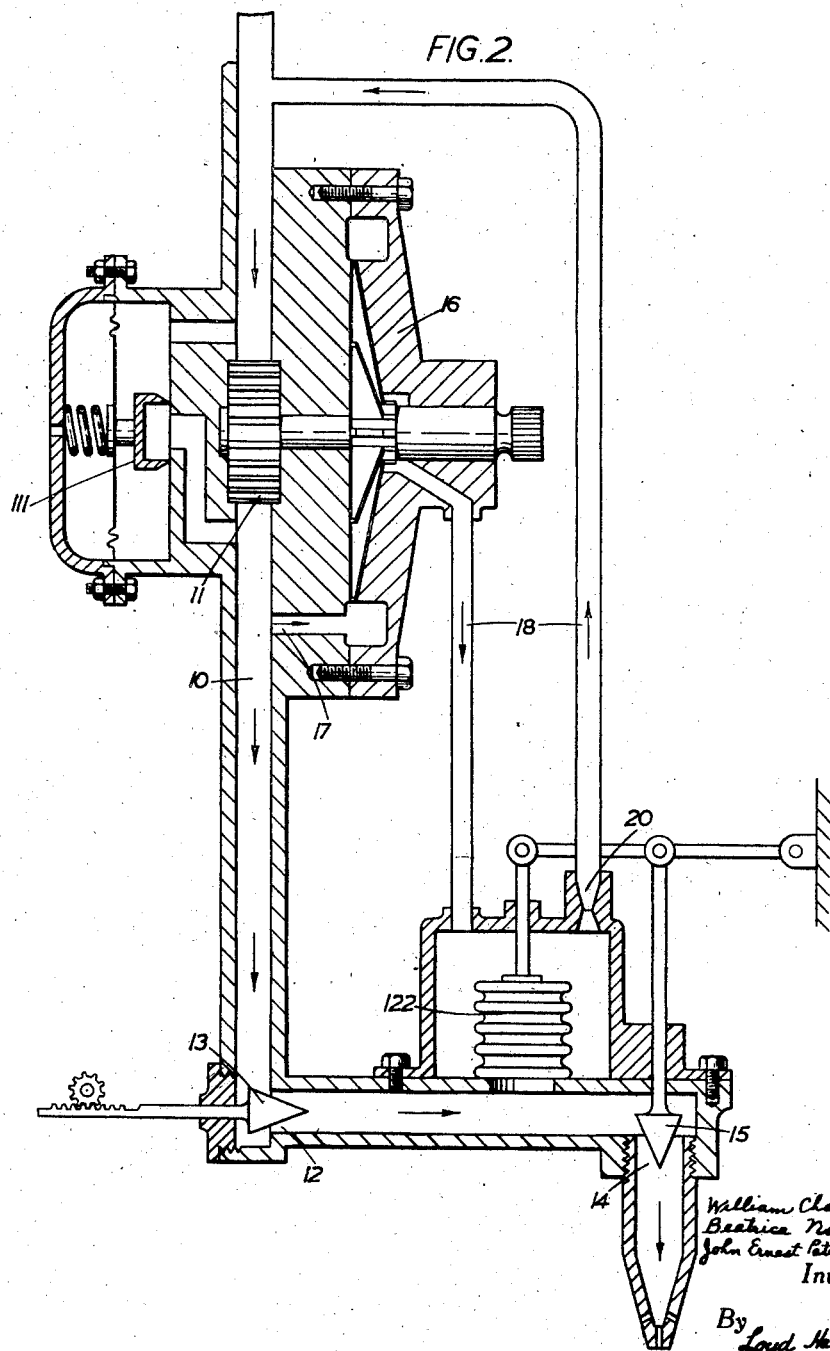

Sept. 3, 1946.  W. C. CLOTHIER ET AL  2,407,139
SYSTEM FOR PRODUCING REGULATED LIQUID PRESSURE
Filed Feb. 14, 1944   3 Sheets-Sheet 3
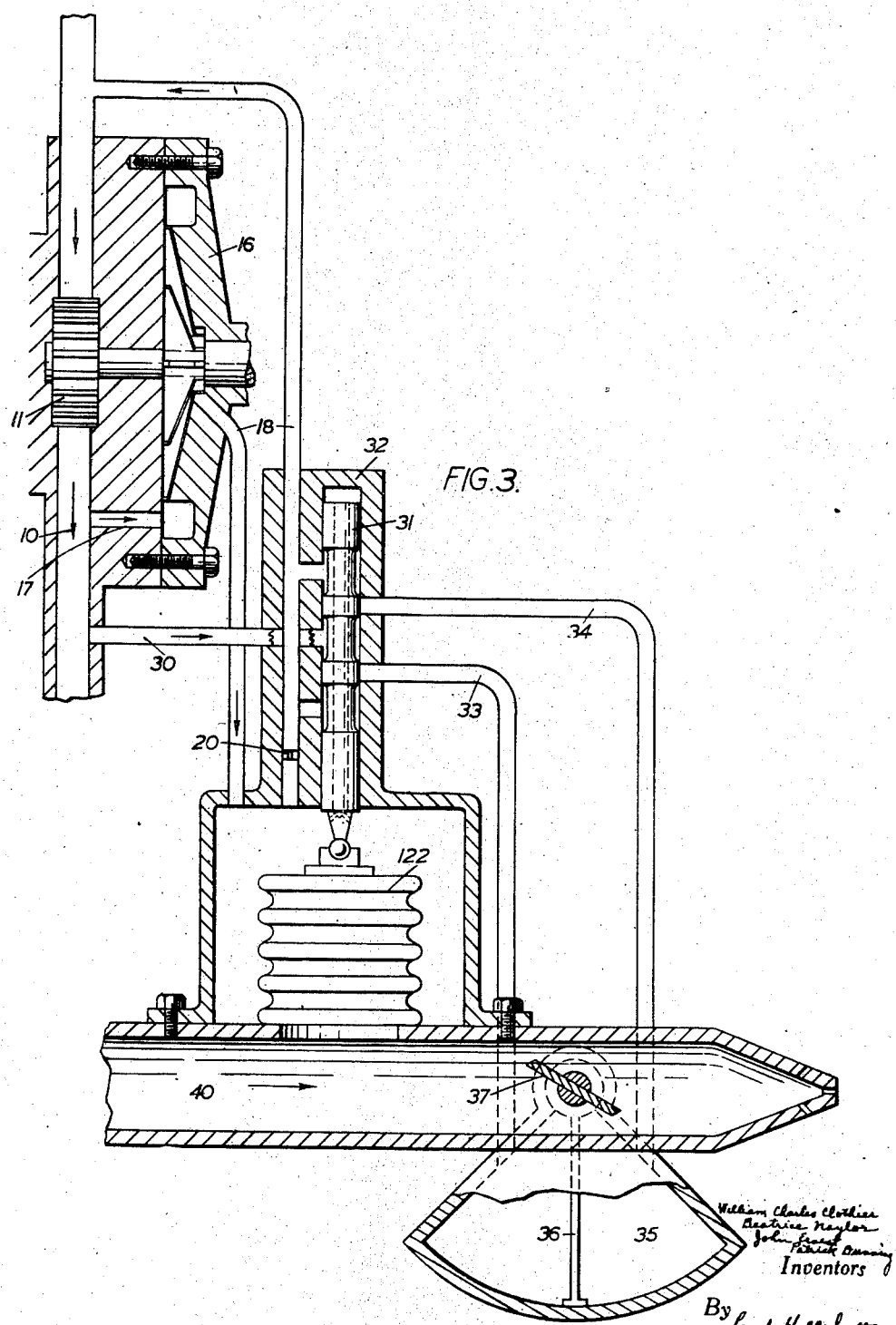

Patented Sept. 3, 1946

2,407,139

UNITED STATES PATENT OFFICE 2,407,139

SYSTEM FOR PRODUCING REGULATED LIQUID PRESSURE

William Charles Clothier, Beatrice Naylor, and John Ernest Patrick Dunning, Farnborough, Hants, England, assignors to the Minister of Supply in His Majesty's Government of the United Kingdom of Great Britain and Northern Ireland, London, England Application February 14, 1944, Serial No. 522,352
In Great Britain July 7, 1941

9 Claims. (Cl. 103—11)

The invention relates to a fluid supply regulating system including an adjustable fluid pressure actuated flow regulating valve and a variable speed centrifugal pump for producing liquid pressure to actuate said valve.

It is a property inherent in any centrifugal pump in normal operation that when the liquid being pumped passes from an inlet near the axis of the pump to an outlet near the periphery, any gas dissolved in the liquid tends to separate in the pump and to collect near the axis where the pressure is lowest, and is discharged from the pump in "gulps." If, therefore, a centrifugal pump having the normal direction of circulation of liquid is employed to generate pressure for actuating a valve, the periodic collection and discharge of gas in and from the centrifugal pump disturbs the operation of the valve. A centrifugal pump has, however, the advantage that the pressure difference across the pump varies as the square of its speed, and hence the adjustment of the flow regulating valve varies in a known relationship with the speed at which the pump is driven.

An object of the invention is to produce a fluid supply regulating system in which a variable speed centrifugal pump is employed to actuate an adjustable flow regulating valve but in which the disadvantage mentioned above is obviated or minimized.

It is a further object of the invention to produce a fuel supply system for an internal combustion engine embodying an engine driven centrifugal pump for actuating a flow regulating valve whereby said valve is maintained adjusted in accordance with a function of the engine speed, while the inherent disadvantages of a centrifugal pump in such a system are minimized or obviated.

These objects are attained by reversing the flow through the centrifugal pump so that liquid is forced through the pump towards the axis thereof. In this way the centrifugal pump still generates a pressure difference (which is shown as a pressure drop across the centrifugal pump) which varies as the square of the speed at which it is driven, but any gas separating in the centrifugal pump, instead of collecting and gradually filling the casing, is continuously removed from the liquid outlet near the axis of the pump with the liquid passing through said outlet.

Additional objects and advantages of the invention will become apparent from the following more detailed description of systems embodying the same read in conjunction with the accompanying drawings, in which Figs. 1–3 are three schematic views of alternative systems in accordance with the invention, and Fig. 4 is a sectional view of one form of variable radius centrifugal pump.

Referring to Fig. 1, 10 is a duct for supplying fuel to an internal combustion engine the fuel being supplied under pressure by a pump 11, and passing through a metering orifice 12, whose effective area is adjustable by a valve member 13, and through a second orifice 14 on the downstream side thereof, the effective area of orifice 14 also being variable by a valve member 15.

An engine-driven centrifugal pump 16, which always generates a pressure lower than that of the first or main pump 11, is connected to the duct 10 in parallel with the pump 11, so that liquid from the downstream or high pressure side of pump 11 passes through pipe 17 and enters pump 16 at or near its periphery, and flows through the pump 16 towards its axis, leaving near the axis of the pump 16 through pipe 18 which returns it to duct 10 on the upstream side of pump 11. To control to a low value the flow of liquid through the pump 16, the pipe 18 is constricted as shown at 20.

A tapping in the pump 16, nearer the axis thereof than the tapping connected to pipe 17 but not so near to the pump axis as the tapping connected to pipe 18, supplies liquid from pump 16 through pipe 21 to one side of a flexible diaphragm 22 carrying the valve 15, and the other side of which is exposed to the pressure of the liquid between the apertures 12 and 14.

When the system is running, if P represents the fluid pressure in the pipes 10 and 17, N the rate of rotation of the centrifugal pump 16, R, R' and R" the effective radii at which the pipes 18, 21 and 17 are respectively connected to the centrifugal pump 16, and K a constant:

$$P - KN^2(R''^2 - R'^2) \qquad (I)$$

represents the pressure at 21, and $$P - KN^2(R''^2 - R^2) \qquad (II)$$

represents the pressure at 18.

Thus irrespective of the instantaneous value of P, the pressures at 21 and 18 are less than P (pressure at 17) by an amount which is directly dependent on the square of the rotational speed of the centrifugal pump 16 and variation in the value of P does not cause variation in the above-mentioned pressure difference.

It must be understood that the mechanical design is such that within the attainable rotational speed range for the centrifugal pump 16 the pressure difference generated thereby must always be less than the pressure difference generated by the pump 11 so that the expressions (I) and (II) above always represent positive values.

Accordingly, with the system running, if the speed of pump 16 is increased, the pressure difference which it generates will increase, hence it will pass less liquid and the pressures in pipes 18 and 21 will decrease. The diaphragm 22 and valve 13 will consequently move to increase the effective area of orifice 14, and hence to cause a reduction of pressure on the upstream or high pressure side thereof, hence increasing the pressure difference at the two sides of the metering orifice 12. Since the pressure difference across the metering orifice 12 is a function of the square of the speed at which the engine-driven centrifugal pump 16 is driven the flow through said orifice will be a function of the engine speed, and by connecting the valve 13 through a rack and pinion or other mechanism to other actuating means the effective area of said orifice may be made dependent on one or more other factors, so that the fluid supply to the engine may be made to vary as a function of the engine speed and other factors. Further means for adjustment may be provided by interposing a manually or automatically controllable two speed, or multi-speed, or continuously variable speed gear in the drive for the centrifugal pump, or by substituting for the pump 16 a variable radius pump as shown in Fig. 4.

The system shown in Fig. 2 differs from that shown in Fig. 1, in that there is embodied in the pump 11 a by-pass controlled by a spring loaded valve 111, whereby the pressure generated by the pump 11 is limited to a predetermined maximum. The pressure responsive element actuated by the centrifugal pump 16 is shown as a flexible bellows 122 instead of the diaphragm 22 in Fig. 1, and it will be observed that the bellows 122 is subjected to the pressure in the pipe 18 instead of to the pressure at a separate tapping as in Fig. 1.

In the form shown in Fig. 3, a pump 11 again passes liquid along a duct 19 and is connected in parallel with an engine drive centrifugal pump 16 to whose periphery fluid is passed through pipe 17 leaving the eye of the pump through the pipe 18. A flexible bellows 122 has its outside exposed to the pressure of the liquid in the pipe 18, while the pressure of another fluid in a duct 40 acts inside the bellows 122. Movement of the bellows 122 controls the position of a servo control valve 31 in a housing 32 having ports which communicate with a passage 30 connected to a high pressure point in the duct 19, and with a low pressure point through the pipe 18. Further ports are provided in the housing 32 communicating respectively with pipes 33, 34 which open at opposite sides of a chamber 35 divided by a pivoted vane 36 actuating an adjustable valve 37 in the duct 40. Thus a change in the pressure in the liquid surrounding the bellows 122 will cause the bellows 122 and valve 31 to move thus passing high pressure liquid from pipe 30 to enter either 33 or 34, and allowing the other of said pipes to exhaust through pipe 18, whereby the vane 36 and throttle 37 are moved to a new position. The system shown in Fig. 3 may be used for example when the duct 40 contains liquid fuel whose supply under pressure to an internal combustion engine is to be controlled, the pump 11 being for example provided to supply oil under pressure to the engine through the duct 19, or may constitute for example an engine speed governing system in which the valve 37 is a throttle located in the induction pipe of the engine, pump 11 then being either a fuel pump or an oil pump, the throttle 37 consequently being moved in response to changes in pressure generated by the engine driven centrifugal pump, and hence in response to changes in engine speed with variations in the load or other operating conditions.

In the systems shown in any of Figs. 1-3, a centrifugal pump with a variable effective radius may be substituted for the pump 16, one form of such pump being shown in Fig. 4, in which the pump casing 50 is drilled near the pump axis to provide a fixed low pressure connection 51, the high pressure connection 52 for the pump communicating with the pump through an eccentric passage 53 drilled through a pivoted plate 54 which may be rotated to vary the effective radial distance between the low pressure connection 51 which is fixed and the passage 53 which is movable, by means of a handwheel 55 prevented from accidental movement by a spring loaded ball 56. In an alternative form (not shown) two or more fixed high or low pressure connections may be arranged at different radial distances from the pump axis, a selector valve being employed to enable the desired connection to be selected.

We claim:

1. A system for regulating an adjustable flow control valve comprising a duct for supplying liquid under pressure, means for producing a pressure difference between two parts of the duct, a driven centrifugal pump for producing a pressure difference less than the pressure difference between the two parts of the duct, said centrifugal pump having an intake near its periphery connected to the high pressure part of the duct and an outlet nearer its eye connected to the low pressure part of the duct, so that the liquid passes through the centrifugal pump in a direction opposed to the pressure gradient therein, and means responsive to pressure changes in said pump for actuating the valve to be regulated.

2. A system for producing regulated liquid pressure comprising a duct for supplying liquid under pressure, means for producing a pressure difference between two parts of the duct, a driven centrifugal pump for producing a pressure difference less than the pressure difference between the two parts of the duct, said centrifugal pump having an intake near its periphery connected to the high pressure part of the duct and an outlet nearer its eye connected to the low pressure part of the duct, so that the liquid passes through the centrifugal pump in a direction opposed to the pressure gradient therein, and means responsive to pressure changes in said pump for regulating the flow of liquid in said duct.

3. A system for producing regulated liquid pressure comprising a duct containing liquid, a supply pump for passing liquid along said duct and for creating a pressure difference therein, a centrifugal regulating pump for generating a pressure difference smaller than the pressure difference created by the supply pump and having an inlet near its periphery connected to the high pressure side of said supply pump and an outlet nearer its eye connected to the low pressure side of said supply pump, and means responsive to pressure changes in said centrifugal pump for regulating the flow of liquid in said duct.

4. A system for controlling liquid flow comprising a duct for liquid, a supply pump for passing liquid along said duct and for creating a pressure difference therein, a centrifugal regulating pump for creating a pressure difference smaller than the pressure difference created by the supply pump and connected to said supply pump so that the pressure difference created by the regulating pump opposes the pressure difference created by the supply pump, a metering orifice located in said duct on the downstream side of said pump, a second metering orifice on the downstream side of the first metering orifice, and means responsive to a pressure created by said regulating pump for adjusting the area of the second metering orifice, whereby the pressure difference at the two sides of the first metering orifice and the rate of liquid flow therethrough is varied in accordance with the pressure generated by the centrifugal regulating pump.

5. A system for controlling liquid flow comprising a duct for liquid, a supply pump for passing liquid along said duct and for creating a pressure difference therein, a centrifugal regulating pump for creating a pressure difference smaller than the pressure difference created by the supply pump and connected to said supply pump so that the pressure difference created by the regulating pump opposes the pressure difference created by the supply pump, a metering orifice located in said duct on the downstream side of said pump, a second metering orifice on the downstream side of the first metering orifice, and pressure-responsive means acted upon in opposition by a pressure created by the centrifugal pump and by the pressure in said duct between said metering orifices for adjusting the area of the second metering orifice, whereby the pressure difference at the two sides of the first metering orifice and the rate of liquid flow therethrough is varied in accordance with the pressure generated by the centrifugal regulating pump.

6. A system for regulating an adjustable flow control valve, comprising a duct, a supply pump for passing liquid along said duct and for creating a pressure difference therein, a centrifugal regulating pump for creating a pressure difference smaller than the pressure difference created by the supply pump and so connected to the supply pump that the pressure differences created by said pumps act in opposition and liquid flows through said centrifugal pump in opposition to the pressure gradient therein, and a pressure-responsive member adapted to be acted on by a pressure generated by said centrifugal regulating pump and adapted to actuate the valve to be regulated.

7. A liquid supply regulating system comprising a duct for the passage of liquid, a supply pump for feeding liquid to said duct, a variable speed centrifugal pump connected across said supply pump so that liquid flows through said centrifugal pump in opposition to the pressure gradient therein, a fluid pressure actuated flow regulating valve in said duct, and means for actuating said valve in response to pressure changes within said centrifugal pump.

8. A liquid supply system as claimed in claim 7 in which the centrifugal pump has a variable effective radius.

9. A liquid fuel supply system for an internal combustion engine comprising a duct, a supply pump for feeding fuel to said duct, a metering orifice in said duct downstream of the supply pump, an adjustable flow regulating valve in said duct downstream of the metering orifice, an engine driven centrifugal pump with a peripheral inlet connected to said duct between the supply pump and metering orifice whereby fuel is passed through said centrifugal pump in opposition to the pressure gradient therein, a pressure responsive member connected to the flow regulating valve and on which the pressure at the low pressure side of the metering orifice acts in opposition to a pressure generated by the centrifugal pump downstream of its peripheral inlet, whereby said flow regulating valve is continuously adjusted to maintain the pressure drop across the metering orifice proportional to the pressure drop existing across the centrifugal pump and hence to the square of the engine speed.

WILLIAM CHARLES CLOTHIER.
BEATRICE NAYLOR.
JOHN ERNEST PATRICK DUNNING.